United States Patent [19]
Bittern

[11] 3,784,316
[45] Jan. 8, 1974

[54] HOLE SAW AND REVERSIBLE QUICK DISCONNECT DRIVE THEREFOR

[75] Inventor: Joseph E. Bittern, Weatogue, Conn.

[73] Assignee: Capewell Manufacturing Company, Hartford, Conn.

[22] Filed: July 12, 1972

[21] Appl. No.: 271,039

[52] U.S. Cl............. 408/204, 144/20, 144/23, 287/53 R, 151/16, 279/1 B, 408/703
[51] Int. Cl............................................ B23b 51/04
[58] Field of Search............ 408/191, 196, 204, 408/209, 231, 232, 233, 239, 703; 145/121; 144/20, 21, 22, 23, 24; 287/53 R; 151/16, 17, 18; 279/1 B

[56] References Cited
UNITED STATES PATENTS

| | | | |
|---|---|---|---|
| 972,669 | 10/1910 | Wilt | 151/17 |
| 2,482,439 | 9/1949 | Smith | 144/23 X |
| 2,562,327 | 7/1951 | Moore | 287/53 R X |
| 3,697,310 | 3/1972 | Morse | 408/209 |

Primary Examiner—Andrew R. Juhasz
Assistant Examiner—Z. R. Bilinsky
Attorney—John M. Prutzman et al.

[57] ABSTRACT

A hole saw equipped with a quick disconnect drive arbor having a pair of axially spaced threaded sections of opposite threaded direction with a non-locking included angle between the helices thereof of about 15°. A drive ring is mounted on the threads with the higher helix angle and a hole saw on the other threaded section. Rotation of the drive ring and hole saw in unison relative to the drive shaft in one direction causes the bottoming of the drive ring and the hole saw for transmitting torque. Reverse rotation quickly disconnects the hole saw from the arbor. To accommodate the use of the drive arbor with a reversible power unit, a locking ring having a non-circular aperture is slidably mounted around a mating portion of the arbor and is rotatable around a reduced cross section neck of the arbor to a locking position to prevent axial movement of the drive ring upon reverse rotation of the shaft. The neck of the arbor is provided with lobes forming stops to establish the locking and non-locking position of the lock ring. A compression spring frictionally engages the drive ring and the locking ring to resist relative rotation and to urge the locking ring away from the drive ring in the non-locking position thereof.

9 Claims, 3 Drawing Figures

PATENTED JAN 8 1974

3,784,316

HOLE SAW AND REVERSIBLE QUICK DISCONNECT DRIVE THEREFOR

BACKGROUND AND SUMMARY OF THE INVENTION

The present invention relates generally to a hole saw and is an improvement upon the invention described and claimed in my copending patent application Ser. No. 271,040 entitled Hole Saw and Quick Disconnect Drive Therefor filed (Our Ref: Capewell Case 33 executed July 7, 1972)

Hole saws of the type involved in this invention are generally driven by a portable power unit, e.g., an electric drill. Many such power units are equipped with reversing switches to provide reverse rotation for the output spindle and are reversed to assist in the extraction of the drill or other driven tool from the work piece. With users being accustomed to this operating procedure, it is important for a rotary drive coupling for a hole saw to accommodate this customary procedure in the removal of the hole saw for the work piece and it is the principal object of this invention to provide a foolproof, simple and inexpensive solution for this problem.

Another object of this invention is to provide a new and improved quick release drive arbor assembly for hole saws and the like which accommodate the reverse rotation retraction of the tool from the workpiece. Included in this object is the provision of an axially movable and rotatable lock in which positive stops are provided to fix the rotational positions for locking and unlocking.

Other objects will be in part obvious and in part pointed out more in detail hereinafter.

A better understanding of the invention will be obtained from the following detailed description and the accompanying drawing of an illustrative application of the invention.

DESCRIPTION OF A PREFERRED EMBODIMENT

Figure 1:
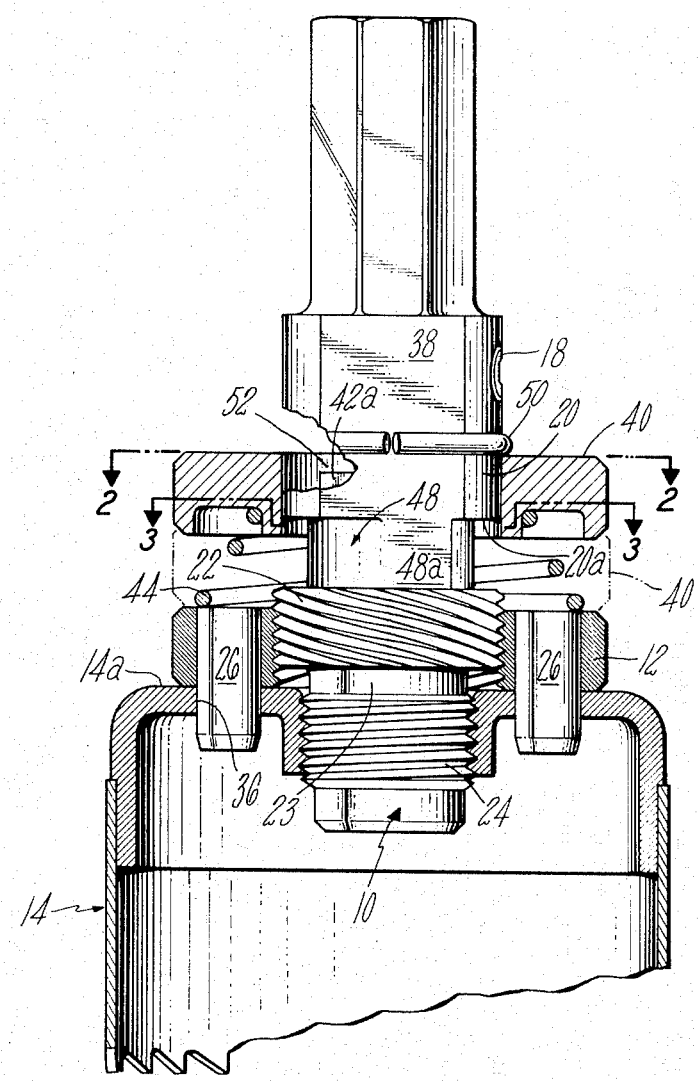
FIG. 1 is an elevational view, partially in section, of a hole saw and arbor assembly embodying the features of the present invention.

Referring now to the drawing in greater detail, the present invention, for clarity of illustration and ease of understanding, is shown and described as embodied in a hole saw.

As more fully described in my copending application Ser. No. 271,040, the hole saw and arbor assembly of the present invention is shown in the drawing as consisting of a drive shaft 10, a drive ring 12, a hole saw 14, the drive ring 12 and the hole saw 14 being adapted for threaded mounting on the drive shaft.

The shaft 10 is shown as being provided with a central bore 16 extending axially along its length for receiving a suitable pilot drill (not shown) which can be conveniently secured within the bore 16 by a set screw 18. As shown, a pair of adjacent threaded screw sections 22, 24 spaced by an unthreaded groove 23 are provided on the drive shaft 10 adjacent its lower end.

The threaded section 22 positioned remote from the lower end of the drive shaft 10 has a left hand thread while the threaded section 24 has a right hand thread. Threaded section 24 is shown as being a single thread configuration while the threaded section 22 is shown as being of a multiple thread configuration with the included angle between the helices of the threads of sections 22, 24 being a non-locking, or self-releasing, angle sufficient, say 15° or more, to permit the easy manual removal of the hole saw 14 without the necessity of an auxilliary assembly tool such as a key.

The drive shaft 10 is provided with an annular flange 20 shown as being formed integrally with the shaft.

In the preferred embodiment, the threaded section 22 is provided with the higher helix angle and the threaded section 24 is provided with a conventional screw thread to accommodate cup shaped hole saws 14 of the type currently available in the market.

The quick disconnect drive ring 12 has a central threaded aperture for threadably engaging the left hand threaded section 22 of the drive shaft 10, the threaded section 24 being of reduced diameter to allow the drive ring 12 to pass thereacross. The drive ring 12 is provided with a depending pair of diametrically opposed aligning and drive pins 26 affixed thereto as by being pressed in axial holes therein with a press fit.

As will be appreciated from the foregoing description, the hole saw is easily assembled on the quick disconnect drive arbor by initially rotating the drive ring 12 of the threaded section 22 to its upper position where the ends of pins 26 lie in a plane perpendicular to the axis of the drive shaft 10 and passing through the groove 23. The hole saw 14 is then rotated onto the threaded section 24 until bottoming on the ends of the aligning and drive pins 26. Thereafter the hole saw is backed off, less than 180°, until the pins register with the apertures 36 of the tool. Thereafter a slight further forward rotation of the hole saw 14 in unison with the drive ring 12 will rapidly draw the drive ring into bottoming contact with the saw.

When so assembled, the drive ring provides a solid stabilized support to reinforce the end wall 14a of the hole saw 14 and the use of the opposite threaded sections 22, 24 automatically produces an axial biasing force on the hole saw 14 maintaining it against in solid contact with drive ring 12 as a result of the torque required to rotate the hole saw during use. This prevents any vibration due to relative movement or play between the threads of the hole saw and the threaded section 24 resulting from the normal thread clearances and also produces a biasing force which increases in proportion to the torque loading imposed on the hole saw 14 as more fully described in my copending patent application.

To remove the hole saw 14 from the drive shaft 10, it is merely necessary to rotate the hole saw in the same clockwise direction it travels during use while holding the shaft 10 stationary. This causes the drive ring 12 to move axially away from the hole saw 14 along the multiple threaded section 22 to effect the rapid separation of the hole saw and the drive ring. As soon as the aligning and drive pins 26 clear the apertures of the hole saw, continued rotation of the hole saw 14 alone removes the hole saw from the threaded section 24 of the drive shaft.

As heretofore stated, hole saws of the type involved in this invention are often driven by a portable electric power unit, such as an electric drill, many of which are provided with reversing switches to facilitate the removal of the tool from the work piece.

In accordance with this invention, means are provided for preventing the disconnecting of the hole saw 14 from the drive shaft 10 during such reverse rotation and to allow the hole saw to be removed from the workpiece in the customary manner of a tool provided by an operator having a reversing switch.

Figure 2:
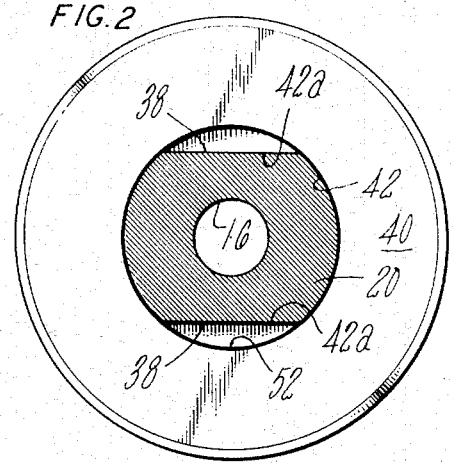
FIG. 2 is a cross-sectional view taken along the lines 2—2 of FIG. 1.

As shown in FIG. 2, the flange 20 is generally cylindrical in cross section with a pair of parallel flats 38 on opposed sides thereof. The axially slidable and rotatable locking ring 40 has, as shown in FIG. 2, an inner periphery 42 having a similar cross sectional configuration so that it is axially slidable on flange 20. A conical spring 44 is provided to bias the locking ring upwardly with respect to the drive ring 12. The lock ring 40 is provided with an annular recess 46 of sufficient depth to receive the conical spring therein. The flange 20 has a neck 48 having the cross section shown in FIG. 3 for purposes hereinafter more fully described. A groove is provided in the flange 20 for receiving a resilient wire ring 50 which serves as a stop to limit the upper movement of the lock ring 40.

With the drive ring 12 and the hole saw 14 bottomed against each other as shown in FIG. 1, the lock ring 40 is pushed axially downwardly along the flange 20 guided by the flats 38, and flats 48a of neck 48 which lie in the plane of flats 38, against the bias of the spring 44 until it engages the drive ring 12 as shown in phantom in FIG. 1.

Figure 3:
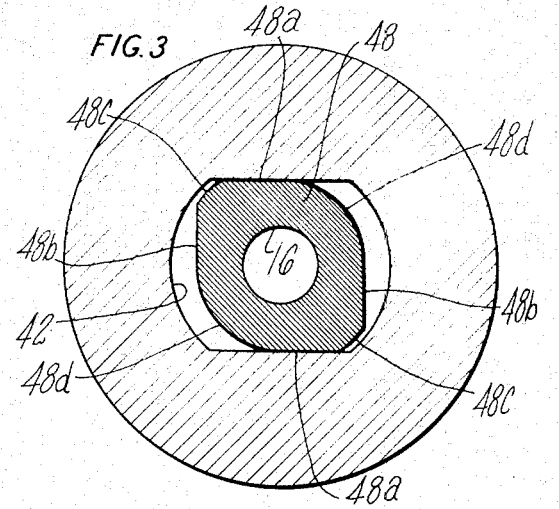
FIG. 3 is a cross-sectional view taken along the lines 3—3 of FIG. 1.

As best shown in FIG. 3, the neck 48 of the flange 20 has a second pair of opposed parallel flats 48b which cooperate respectively with the flats 48a to form a pair of lobes 48c. Pairs of flats 48a and 48b are formed on a tangent to circular portions 48d with the circular portions having a diameter substantially equal to the distance between the flats 42a of the locking ring 40.

With this construction, it can be seen that when the locking ring 40 is engaged with the drive ring 12 it lies in the plane of the neck 48 and may be rotated to the right as viewed in FIG. 2 until the flats 42a engage the flats 48b of the neck 48 which serve as stops to prevent the further rotation of the lock ring 40 and positively locate the lock ring in locking position with its flats 42a in a position beneath the shoulders 20a (FIG. 1).

The ring 40 is provided with an annular recess 52 which cooperates with the circular portion of the flange 20 to maintain the lock ring 40 concentric with the drive shaft at all points of rotation. The engagement between the ends of conical spring 44 and drive ring 12 and lock ring 40, respectively, serve to maintain the lock ring against rotation during the use of the hole saw.

When it is desired to remove the saw 14, all that is necessary is to rotate the lock ring counterclockwise, as viewed in FIGS. 2 and 3, until the flats 42a of the lock ring engage the flats 48a of the neck 48 to provide positive and accurate alignment and easy axial movement of the lock ring under the bias of the spring to a position against wire ring 50.

The hole saw 14 may then be removed from the drive shaft 10 by rotation of the hole saw 14, and drive ring 12 clockwise relative to drive shaft 10.

As will be apparent to persons skilled in the art, various modifications, adaptations and variations of the foregoing specific disclosure can be made without departing from the teachings of the present invention.

I claim:

1. In a hole saw assembly equipped with a quick disconnect rotatable drive arbor including a drive shaft having first and second threaded sections of opposite thread direction, the included angle between the helices of the threaded sections being a non-locking angle, a drive ring threadably mounted on one of said threaded sections, and a hole saw threadably mounted on the other of said threaded sections for rapid assembly and disassembly of the hole saw and the drive shaft; the improvement comprising a locking ring mounted on said shaft, said locking ring being rotatable to locking position where it prevents the axial movement of said drive ring upon reverse rotation of said arbor and to a non-locking position where it accommodates axial movement of said drive ring upon reverse rotation of said arbor.

2. The device of claim 1 wherein said drive arbor is provided with radial shoulder means and said locking ring is provided with shoulder means which engages said radial shoulder means in locking position.

3. The device of claim 2 wherein a biasing spring is positioned between said locking ring and said drive ring.

4. The device of claim 3 wherein said spring frictionally engages said locking ring and said drive ring to resist relative rotation.

5. The device of claim 2 wherein said drive arbor has a neck of reduced cross section to provide said radial shoulder means.

6. The device of claim 5 wherein said neck has a non-circular periphery having walls providing lobes and the locking ring has a non-circular aperture having walls engageable therewith to limit relative rotation therebetween and establish the locking and non-locking positions of said locking ring.

7. The device of claim 6 wherein said arbor adjacent said neck has a non-circular periphery which mates with said non-circular periphery of said locking ring to accommodate relative axial sliding movement therebetween.

8. The device of claim 7 wherein the walls of said neck establishing the non-locking position of said locking ring are axial extensions of walls of the adjacent non-circular periphery of the arbor to guide the locking ring in its axial sliding movement in its non-locking position.

9. The device of claim 6 wherein the non-circular aperture of said locking ring is formed in a recess defined by a circular wall dimensioned to engage the periphery of said arbor adjacent said neck to maintain the locking ring concentric with said arbor during the rotation thereof between its locking and non-locking positions.

* * * * *